Nov. 23, 1926.

W. KASSTEEN 1,608,321

APPARATUS FOR ARC WELDING

Filed June 1, 1925

Inventor
Willem Kassteen
by M. H. Babcock & Son
Attorneys

Patented Nov. 23, 1926.

1,608,321

UNITED STATES PATENT OFFICE.

WILLEM KASSTEEN, OF AMSTERDAM, NETHERLANDS.

APPARATUS FOR ARC WELDING.

Application filed June 1, 1925, Serial No. 34,104, and in the Netherlands June 10, 1924.

With the known methods of welding a special dynamo is required so that on board ships and under many other circumstances where there is not sufficient welding work for rendering the great expense of a special dynamo economic, no welding can be executed.

The present invention has for its primary object to provide means whereby welding may be done with any electric plant without the use of a special dynamo such as heretofore commonly in use for this purpose.

The invention consists in using a resistance comprising electric conductors which are immersed in a liquid.

In the accompanying drawing a resistance according to the present invention is shown by way of an example.

Figure 1:
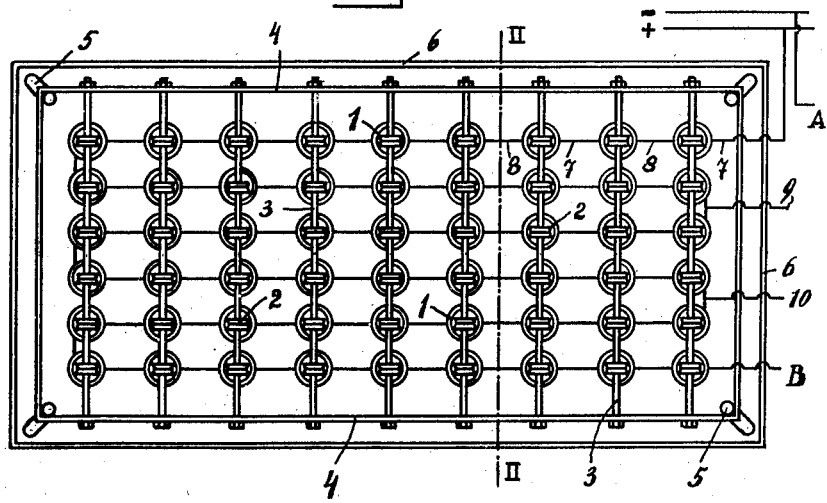
Fig. 1 is a plan view.
Figure 2:
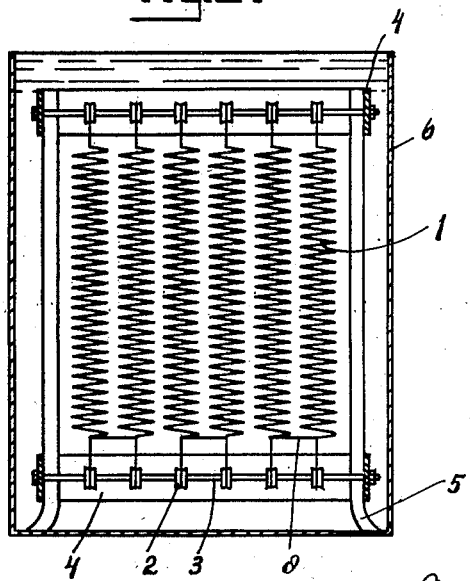
Fig. 2 is a vertical section along the line II—II of Fig. 1.

The welding circuit comprises a source of power, not shown, a negative wire connected by means of a lead or contact A to the object to be welded, a positive wire and a resistance connected in circuit therewith and with a lead wire or contact B connected to the fish-bolt.

The resistance may comprise 54 spirals 1 of 28 coils each, the material being round ingot-iron of about $\frac{3}{16}''$ section. These spirals are supported in top and at the base by insulators 2 slipped over bars 3 which are arranged between the sides of a metallic frame 4 with legs 5. This frame is placed in a tray 6 which may contain sufficient water, oil or other liquid to immerse the spirals totally.

The spirals are thus alternatively connected at the top and at the bottom with each other by means of conductors 7 and 8 respectively so that they are connected in series. If necessary only a part of the resistance may be used by connecting the fish-bolt to one of the branch conductors 9 and 10, or in any other suitable manner.

Either an alternating or direct current may be employed.

Having fully described my invention, what I claim is:

1. Arc-welding apparatus comprising an electric circuit, an iron resistance, and a cooling medium for said resistance, said cooling medium being a liquid in which said resistance is at least partially immersed.

2. Arc-welding apparatus comprising an electric circuit, an iron resistance in said circuit, a tray in which said iron resistance is normally received and a cooling element normally in said tray, said cooling element being a liquid.

In testimony whereof, I have signed my name to this specification.

WILLEM KASSTEEN.